(12) United States Patent
Guernieri et al.

(10) Patent No.: US 7,273,144 B2
(45) Date of Patent: Sep. 25, 2007

(54) ROTARY CONVEYOR

(75) Inventors: Daniele Guernieri, Porto Mantovano (IT); Stefano Cavallari, Bologna (IT)

(73) Assignee: Azionaria Costruzioni Macchine Automatiche A.C.M.A. S.p.A, Bologna (IT)

( * ) Notice: Subject to any disclaimer, the term of this patent is extended or adjusted under 35 U.S.C. 154(b) by 278 days.

(21) Appl. No.: 10/894,399

(22) Filed: Jul. 19, 2004

(65) Prior Publication Data
US 2005/0077147 A1 Apr. 14, 2005

(30) Foreign Application Priority Data
Jul. 17, 2003 (IT) .......................... BO2003A0433

(51) Int. Cl.
*B65G 47/84* (2006.01)
(52) U.S. Cl. ................ 198/480.1; 198/459.2; 198/479.1
(58) Field of Classification Search ............ 198/459.2, 198/478.1, 480.1, 723, 473.1, 479.1
See application file for complete search history.

(56) References Cited

U.S. PATENT DOCUMENTS

| | | | | | |
|---|---|---|---|---|---|
| 1,017,038 | A | * | 2/1912 | Champ | ............ 198/473.1 |
| 2,176,557 | A | * | 10/1939 | Lippold | ................ 53/281 |
| 2,500,465 | A | * | 3/1950 | Meyer | ............ 198/478.1 |
| 2,827,998 | A | * | 3/1958 | Breeback | ............ 198/441 |
| 5,056,650 | A | | 10/1991 | Kronseder | |
| 5,123,518 | A | * | 6/1992 | Pfaff | ............ 198/480.1 |
| 5,373,934 | A | * | 12/1994 | Jackson et al. | ........... 198/803.8 |
| 5,394,975 | A | * | 3/1995 | Bernhard | ............ 198/473.1 |
| 5,533,608 | A | * | 7/1996 | Adams et al. | ........... 198/478.1 |
| 5,582,285 | A | * | 12/1996 | Kronseder | ............ 198/473.1 |
| 5,784,857 | A | * | 7/1998 | Ford et al. | ............ 53/201 |
| 6,336,766 | B1 | | 1/2002 | De Villele | |
| 6,450,230 | B1 | * | 9/2002 | Otruba | ............ 156/566 |

FOREIGN PATENT DOCUMENTS

| | | |
|---|---|---|
| EP | 0 879 788 | 11/1998 |
| FR | 2 749 285 | 12/1997 |

OTHER PUBLICATIONS

English Abstract of FR 2 749 285 Dated Dec. 5, 1997.

* cited by examiner

*Primary Examiner*—Douglas A Hess
(74) *Attorney, Agent, or Firm*—Ladas and Parry LLP

(57) ABSTRACT

A rotary conveyor has a supporting shaft rotating about a respective longitudinal axis and having a top attachment end having a radial projection; a bottom platform fitted to the supporting shaft; and a circular top plate having a central opening for fitment to the top attachment end. The circular top plate also has, on its peripheral edge, a number of seats, each for receiving a container to be conveyed resting on the bottom platform. The conveyor also has fastening means for fastening the circular top plate to the supporting shaft. The fastening means include at least one clamp movable between an idle position permitting engagement of the top attachment end by the circular top plate or removal of the circular top plate from the top attachment end of the supporting shaft, and a work position to grip the circular top plate between the radial projection and the clamp. And an actuating member moves the clamp between the work position and the idle position.

10 Claims, 9 Drawing Sheets

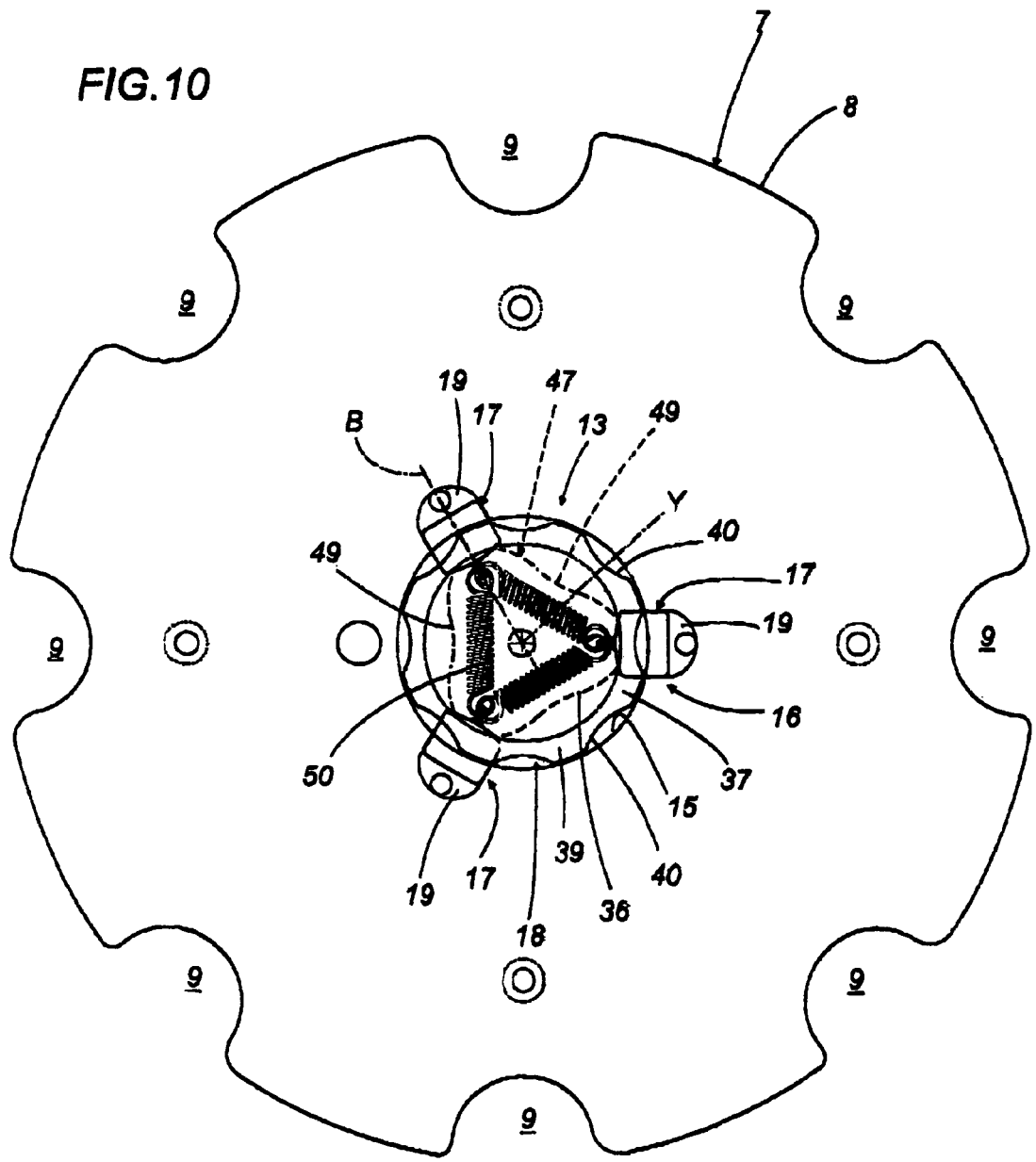

ROTARY CONVEYOR

The present invention relates to a rotary conveyor for transferring containers between two conveying or processing stations.

The present invention may be used in particular for producing and filling containers for liquid substances.

BACKGROUND OF THE INVENTION

As is known, liquid substances are normally packaged using equipment designed to automatically fill a number of empty containers fed along a processing line; and the various processing units, e.g. for filling, closing, and labelling the containers, and packing a number of containers in a package suitable for transport, are connected to one another by linear or angular transfer devices.

Known angular transfer devices, or so-called rotary conveyors, comprise a rotary shaft fitted with a bottom platform; and a top disk having an orderly succession of peripheral seats, each for partly receiving a relative container resting on the bottom platform. The conveyor also comprises a fixed outer guide which, together with the peripheral edge of the top disk, defines a feed channel for the containers; and the conveyor rotates about the longitudinal axis of the rotary shaft to transfer the containers along an arc-shaped path from an input station, e.g. a linear feeder, to an output station, e.g. a filling machine.

The peripheral seats on the top disk are shaped to mate with the engaged container; and, when a change is made in the size of the containers, the top disk must be replaced with another having seats of the right size.

The top disk of known rotary conveyors is bolted to the rotary shaft and therefore awkward to change. In fact, appropriate tools and a certain amount of manual skill on the part of the fitter are required for the job to be done quickly.

SUMMARY OF THE INVENTION

It is an object of the present invention to solve the problems encountered in the known state of the art by providing a rotary conveyor designed to eliminate the aforementioned drawbacks.

More specifically, it is an object of the present invention to provide a rotary conveyor enabling fast, troublefree size change, with no need for special tools.

These and other objects, which will become clear in the course of the following disclosure, are substantially achieved by a rotary conveyor as described and claimed herein.

BRIEF DESCRIPTION OF THE DRAWINGS

A preferred, non-limiting embodiment of a rotary conveyor in accordance with the present invention will be described by way of example with reference to the accompanying drawings, in which:

FIG. 10 shows a plan view of the FIG. 9 conveyor.

DETAILED DESCRIPTION OF THE INVENTION

Number 1 in the accompanying drawings indicates as a whole a rotary conveyor in accordance with the present invention.

Figure 1:
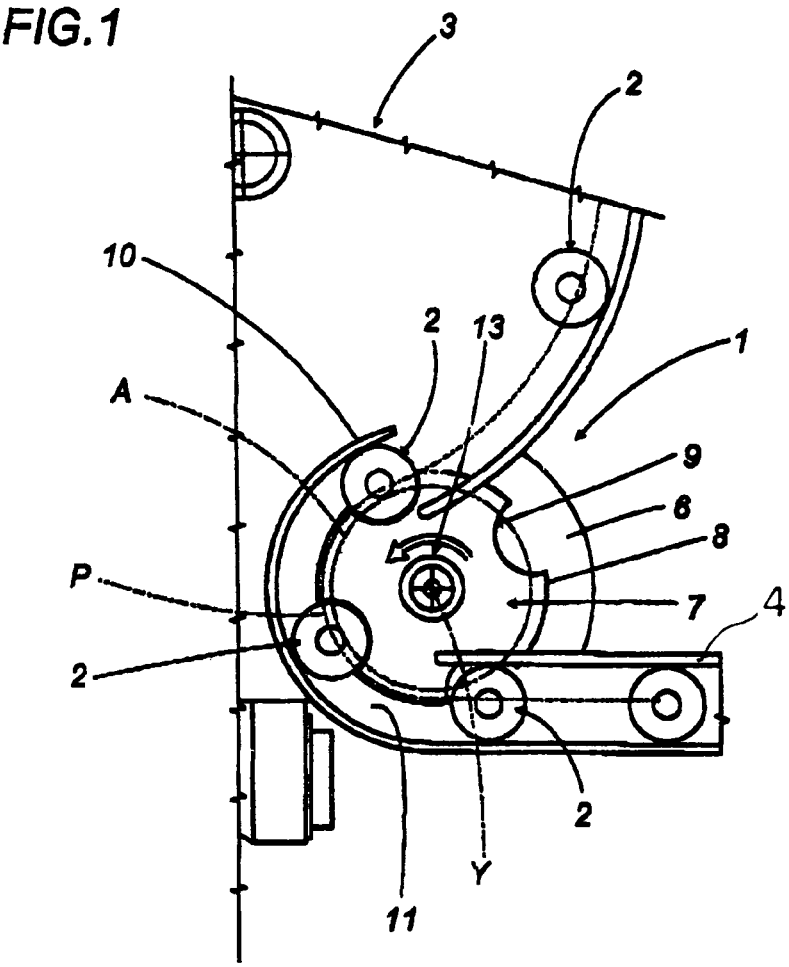
FIG. 1 shows a portion of a liquid container processing system comprising a rotary conveyor in accordance with the present invention.
Figure 2:
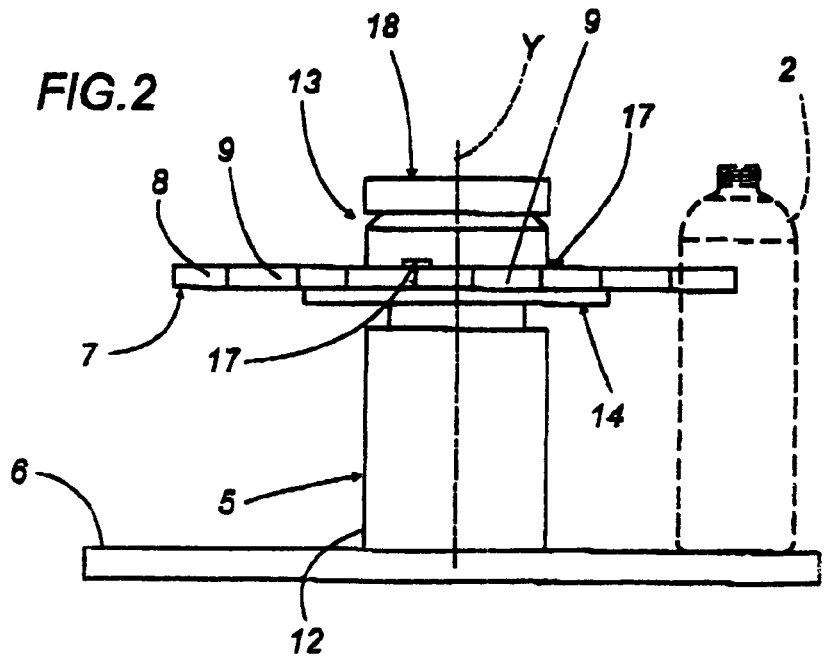
FIG. 2 shows an elevation of the FIG. 1 conveyor together with a container.

More specifically, as shown in FIGS. 1 and 2, rotary conveyor 1 rotates, anticlockwise in FIG. 1, about an axis Y to transfer containers 2 from a known processing station 3, not shown in detail, into a known output conduit 4 along a predetermined arc-shaped path P.

Conveyor 1 comprises a supporting shaft 5 extending along a vertical longitudinal axis coincident with axis of rotation Y. Shaft 5 is fitted with a bottom platform 6 and a circular top plate 7 parallel to each other and perpendicular to axis of rotation Y. Circular top plate 7 comprises, on its peripheral edge 8, a number of seats 9, each for receiving a container 2 to be conveyed resting on bottom platform 6. And, in the embodiment shown, seats 9 are defined by arc-shaped recesses formed in peripheral edge 8 and for engaging, for example, circular-section bottles.

Conveyor 1 preferably also comprises a fixed outer guide 10 extending partly about bottom platform 6 and top plate 7, and defining a feed channel 11, for containers 2, extending along arc-shaped path P.

Bottom platform 6 is fitted integrally to a bottom portion 12 of supporting shaft 5.

Circular top plate 7 is fitted removably to a top attachment end 13 of supporting shaft 5.

More specifically, with reference to FIGS. 3, 5, 7 and 9, top attachment end 13 of supporting shaft 5 has a radial projection 14; and circular top plate 7 has a central opening 15, by which it is fitted onto top attachment end 13 so as to rest on radial projection 14.

Fastening means 16 connect circular top plate 7 integrally to top end 13 of shaft 5, so as to move seats 9 along a given circular trajectory A (FIG. 1) by rotating shaft 5, and to move containers 2 along arc-shaped path P.

Advantageously, fastening means 16 comprise at least one clamp 17 movable between an idle position, permitting engagement of end 13 of shaft 5 by opening 15 in plate 7 or removal of plate 7 from end 13, and a work position in which plate 7 is gripped between radial projection 14 and clamp 17. In the idle position, clamp 17 is housed inside top end 13 of supporting shaft 5; and, in the work position, clamp 17 projects radially outwards of top end 13 of shaft 5.

Fastening means 16 also comprise an actuating member 18 for moving clamp 17 between the work position and the idle position.

Fastening means 16 preferably comprise a number of clamps 17 equally spaced about the longitudinal axis Y of supporting shaft 5, and which, in the embodiments shown in the accompanying drawings, are three in number.

Advantageously, circular plate 7 comprises a number of cavities 19 equal in number to clamps 17, formed close to central opening 15, and each for insertion of a respective clamp 17.

More specifically, top end 13 of supporting shaft 5 is annular in shape and defined by a lateral wall 20, which defines internally a housing 21 for clamps 17.

Lateral wall 20 has a number of openings 22 equally spaced angularly about the longitudinal axis Y of supporting shaft 5 to permit passage of clamps 17.

In the preferred embodiments shown, shaft 5 comprises a shank 23, to which are fitted, coaxially with one another to define top end 13, a cylindrical first body 24 fitted integrally to shank 23 by a screw 25; a cylindrical second body 26 fitted to first body 24 by screws 27; and an annular third body 28 connected to second body 26 by screws 29.

Cylindrical first body 24 comprises a bottom portion 24*a* resting on shank 23; and a top portion 24*b* radially larger than bottom portion 24*a* and defining projection 14 on which circular top plate 7 rests.

Top portion 24*b* of cylindrical first body 24 comprises a seat 30 for a flange 31 forming part of cylindrical second body 26; and holes 32, for screws 27 connecting cylindrical first and second bodies 24, 26, are formed in flange 31 and top portion 24*b* of cylindrical first body 24.

An annular wall 33 extends upwards from flange 31, and has a top edge 33*a* on which annular third body 28 rests and is connected. For which purpose, annular third body 28 and annular wall 33 of cylindrical second body 26 have holes 34 for housing screws 29.

Annular third body 28 and annular wall 33 of cylindrical second body 26 form lateral wall 20 internally defining housing 21 for clamps 17.

Openings 22 for the passage of clamps 17 are preferably formed in annular wall 33.

Clamps 17 are parallelepiped-shaped, each moves between the idle and work position along a radial trajectory B away from or towards longitudinal axis Y, and each has one side aligned with respective radial trajectory B.

Advantageously, actuating member 18 of clamps 17 comprises a substantially cylindrical body 35 which is at least partly inserted in rotary manner inside housing 21 in top end 13 of supporting shaft 5.

Substantially cylindrical body 35 has a cam surface 36 in contact with clamps 17 to move the clamps between the work and idle position by rotating substantially cylindrical body 35.

For which purpose, substantially cylindrical body 35 has a grip portion 37 located outside housing 21, and which is gripped manually to operate actuating member 18.

More specifically, substantially cylindrical body 35 comprises a bottom portion 38 inserted inside housing 21 and having cam surface 36; and a top portion 39 defining grip portion 37. Top portion 39 has peripheral grooves 40 (FIGS. 4, 6, 8, 10) for easy hand grip; and substantially cylindrical body 35 rotates freely about longitudinal axis Y, and is secured axially by a pin 41.

In a first embodiment shown in FIGS. 3, 4, 5 and 6, each clamp 17 has a major dimension aligned with respective radial trajectory B, has a bottom face 17*a* resting on an end surface 26*a* of cylindrical second body 26, and has a top face 17*b* resting on annular third body 28 and detached from a bottom face 42 of substantially cylindrical body 35. Cam surface 36 is defined in a channel 43 formed in the bottom face 42 of substantially cylindrical body 35, and each clamp 17 comprises a pin 44 extending parallel to longitudinal axis Y and inserted and sliding inside channel 43.

Figure 4:
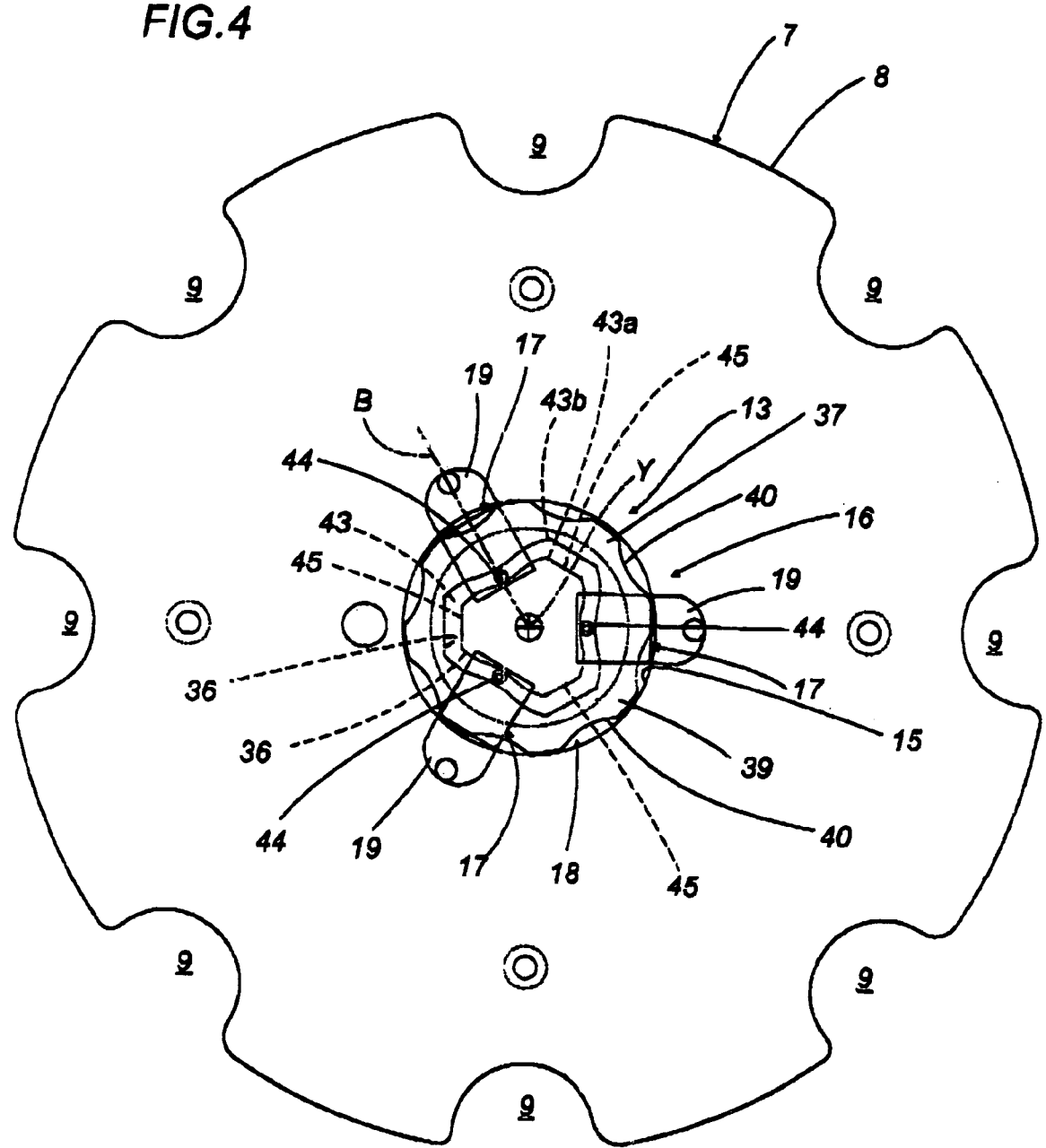
FIG. 4 shows a plan view of the FIG. 3 conveyor.
Figure 6:
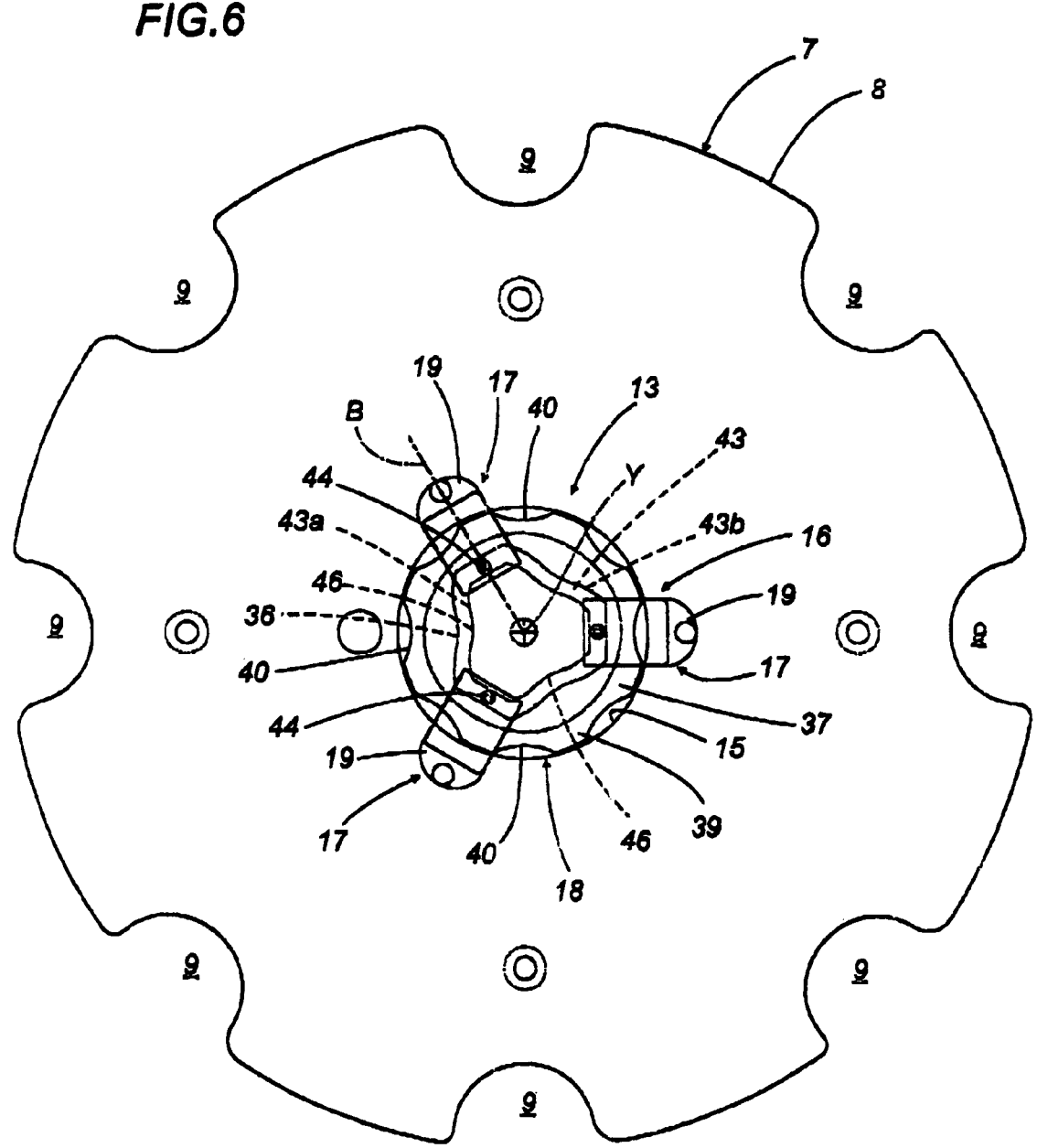
FIG. 6 shows a plan view of the FIG. 5 conveyor.

As shown clearly in FIGS. 4 and 6, channel 43 extends in a plane perpendicular to longitudinal axis Y, along an endless path about longitudinal axis Y, and towards and away from longitudinal axis Y in the form of alternating grooves and ridges equal in number to clamps 17 to be operated.

Cam surface 36 is defined by two facing lateral surfaces 43*a*, 43*b* of channel 43, which are engaged by pin 44 as substantially cylindrical body 35 rotates.

In FIGS. 4 and 6, which show three clamps 17, channel 43 is substantially triangular with three bevelled vertices. More specifically, at the vertices of the triangle, which correspond to positions furthest from longitudinal axis Y, portions are formed extending substantially perpendicular to the radii joining the vertices to longitudinal axis Y, and which have recesses 45 for receiving pins 44 in the work position of clamps 17. Similarly, each side of the triangle has a recess 46 for receiving a pin 44 in the idle position of clamps 17. Recesses 45, 46 provide for stabilizing fastening means 16 in the work and idle position respectively.

In actual use, circular top plate 7 is positioned on the top attachment end 13 of shaft 5 by inserting annular third body 28 and annular wall 33 of cylindrical second body 26 through central opening 15, and resting plate 7 on projection 14.

Figure 3:
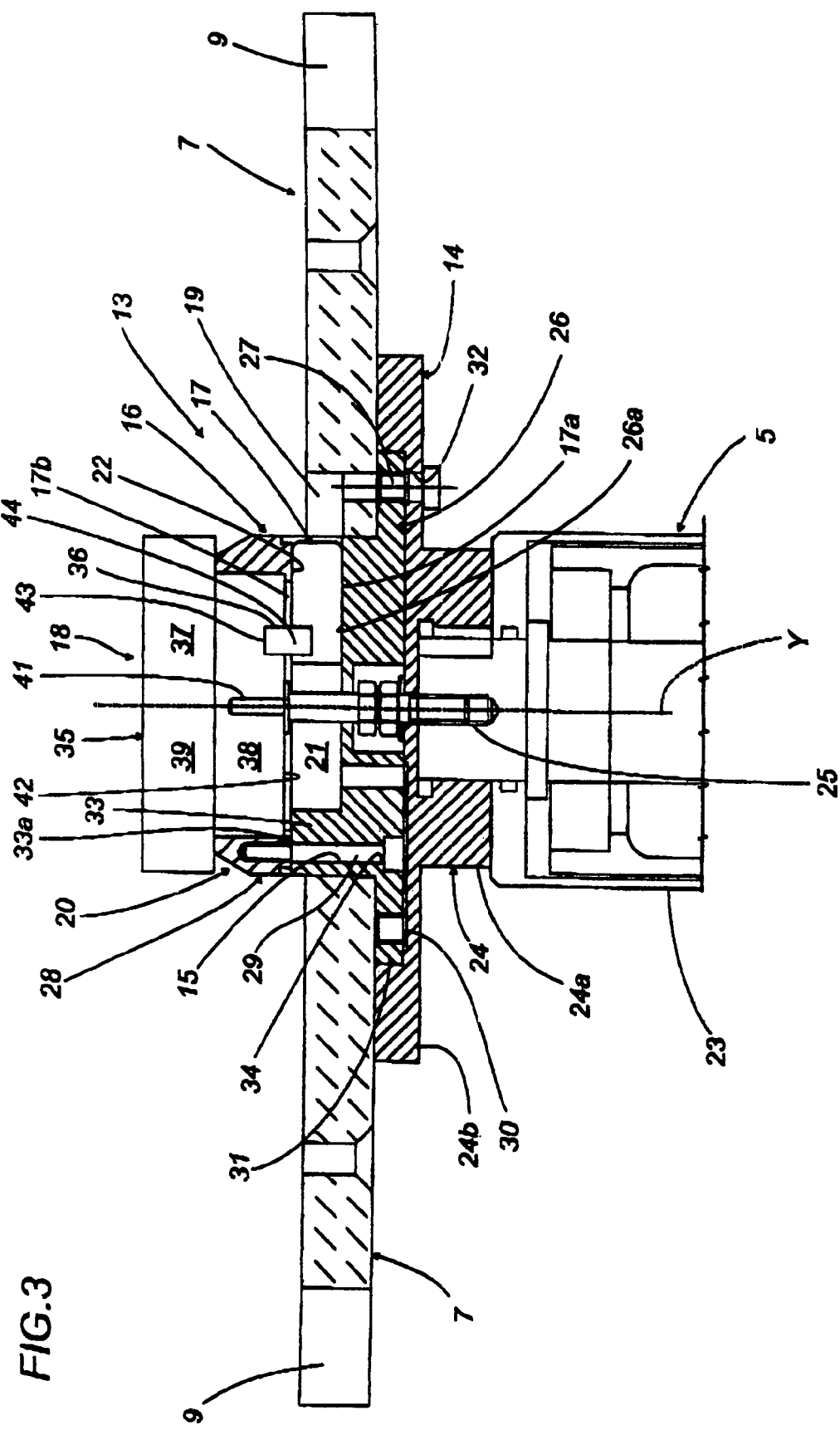
FIG. 3 shows a larger-scale elevation in section of a portion of a first embodiment of the FIG. 2 rotary conveyor in a first operating position.

When positioning circular plate 7, clamps 17 are housed inside housing 21 in top end 13 of shaft 5, so that, as shown in FIGS. 3 and 4, pins 44 of clamps 17 are located inside recesses 46 of channel 43 on the sides of the triangle, in the closest position to longitudinal axis Y.

Figure 5:
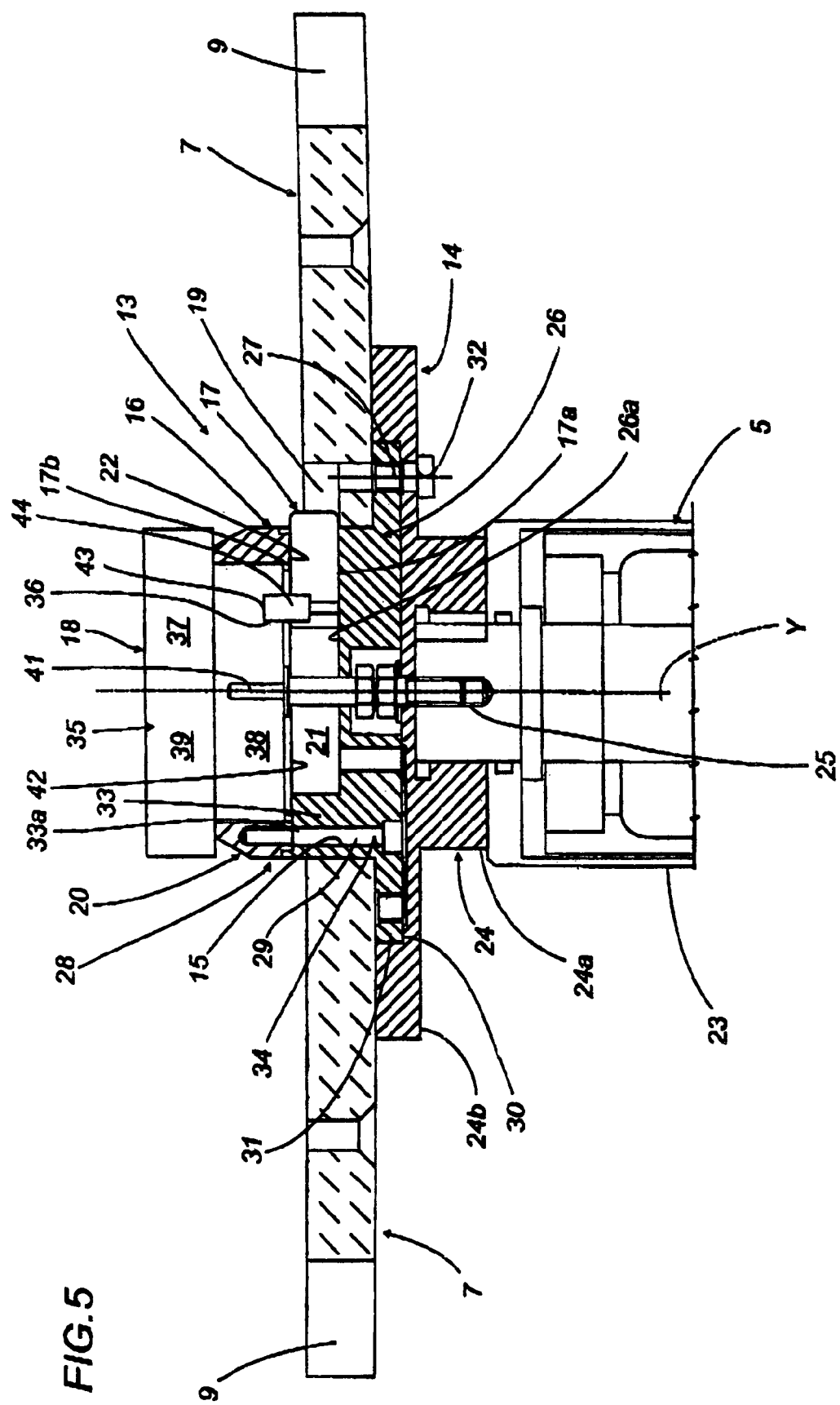
FIG. 5 shows the FIG. 3 conveyor in a second operating position.

When grip portion 37 is rotated manually 60° clockwise or anticlockwise, each pin 44 slides along channel 43, and is forced, by inner surface 43*a* of channel 43, away from longitudinal axis Y and into a recess 45 at a vertex of the triangle, as shown in FIGS. 5 and 6; and clamps 17 are pushed along respective radial trajectories B inside cavities 19 in circular plate 7 to clamp plate 7 both axially and rotationally to shaft 5.

Further 60° rotation in the same or opposite direction moves clamps 17, pushed by outer surface 43*b* of channel 43, back into the idle position.

In a second embodiment shown in FIGS. 7, 8, 9 and 10, cam surface 36 is defined by a lateral wall 47 of cylindrical body 35, and extends parallel to longitudinal axis Y; and each clamp 17 has a rear face 17*c* contacting lateral wall 47 of cylindrical body 35.

Figure 8:
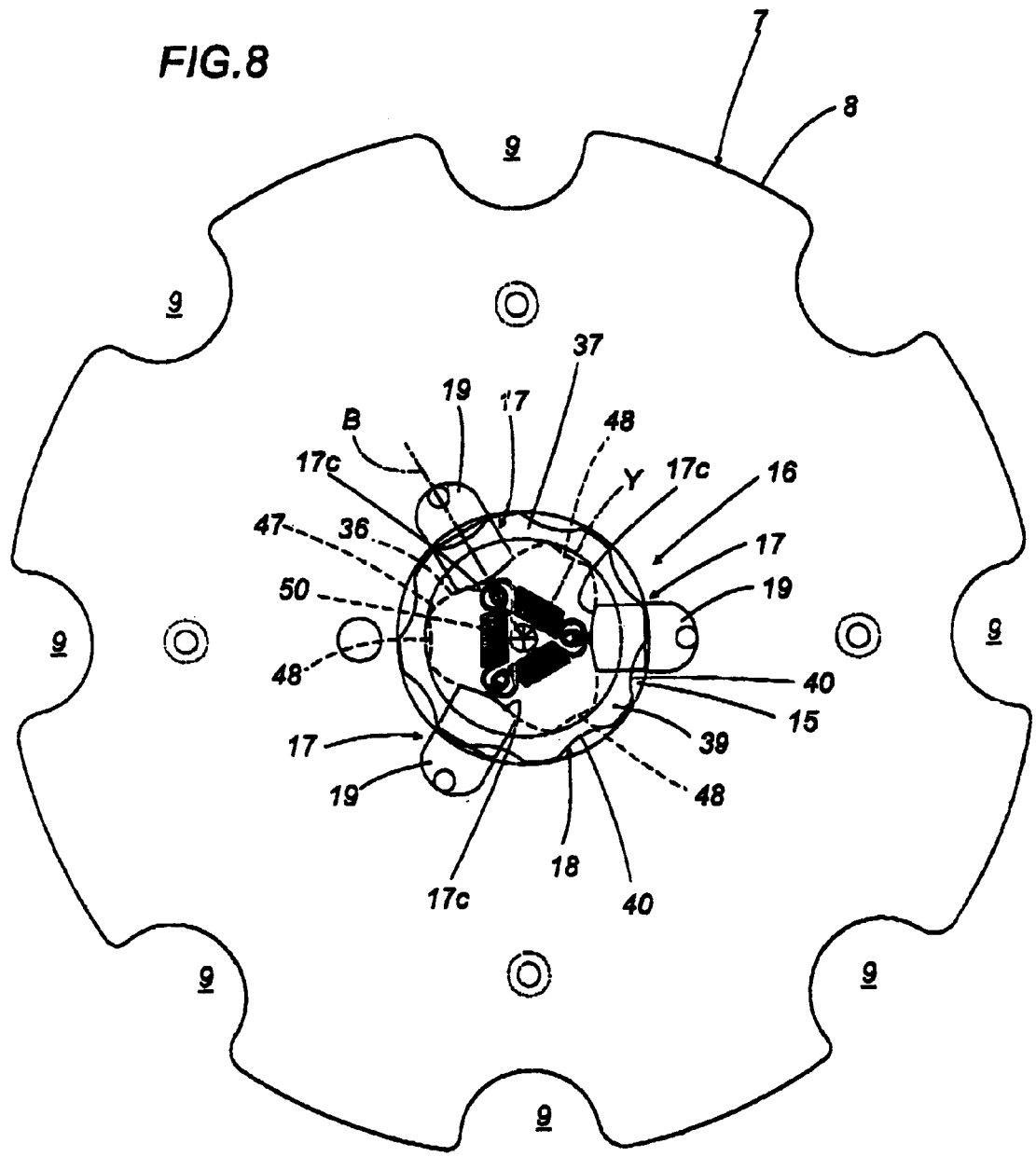
FIG. 8 shows a plan view of the FIG. 7 conveyor.

As shown clearly in FIGS. 8 and 10, lateral wall 47 extends in a plane perpendicular to longitudinal axis Y, along an endless path about longitudinal axis Y, and towards and away from longitudinal axis Y in the form of alternating grooves and ridges equal in number to clamps 17 to be operated.

In FIGS. 8 and 10, which show three clamps 17, lateral wall 47 is substantially triangular with three bevelled vertices. More specifically, at the vertices of the triangle, which correspond to positions furthest from longitudinal axis Y, portions are formed extending substantially perpendicular to the radii joining the vertices to longitudinal axis Y, and which have recesses 48 for receiving rear faces 17*c* of clamps 17 in the work position of clamps 17. Similarly, each side of the triangle has a recess 49 for receiving rear face 17*c* of clamp 17 in the idle position of clamps 17. Recesses 48, 49 provide for stabilizing fastening means 16 in the work and idle position respectively.

In the second embodiment of the present invention, conveyor 1 comprises a number of elastic traction members 50 interposed between clamps 17 to pull clamps 17 towards one another and towards longitudinal axis Y in opposition to cam surface 36. Each elastic member 50 is preferably a spring connecting two angularly adjacent clamps 17; and elastic members for assisting the movement of clamps 17 may also be provided in the first embodiment.

Figure 7:
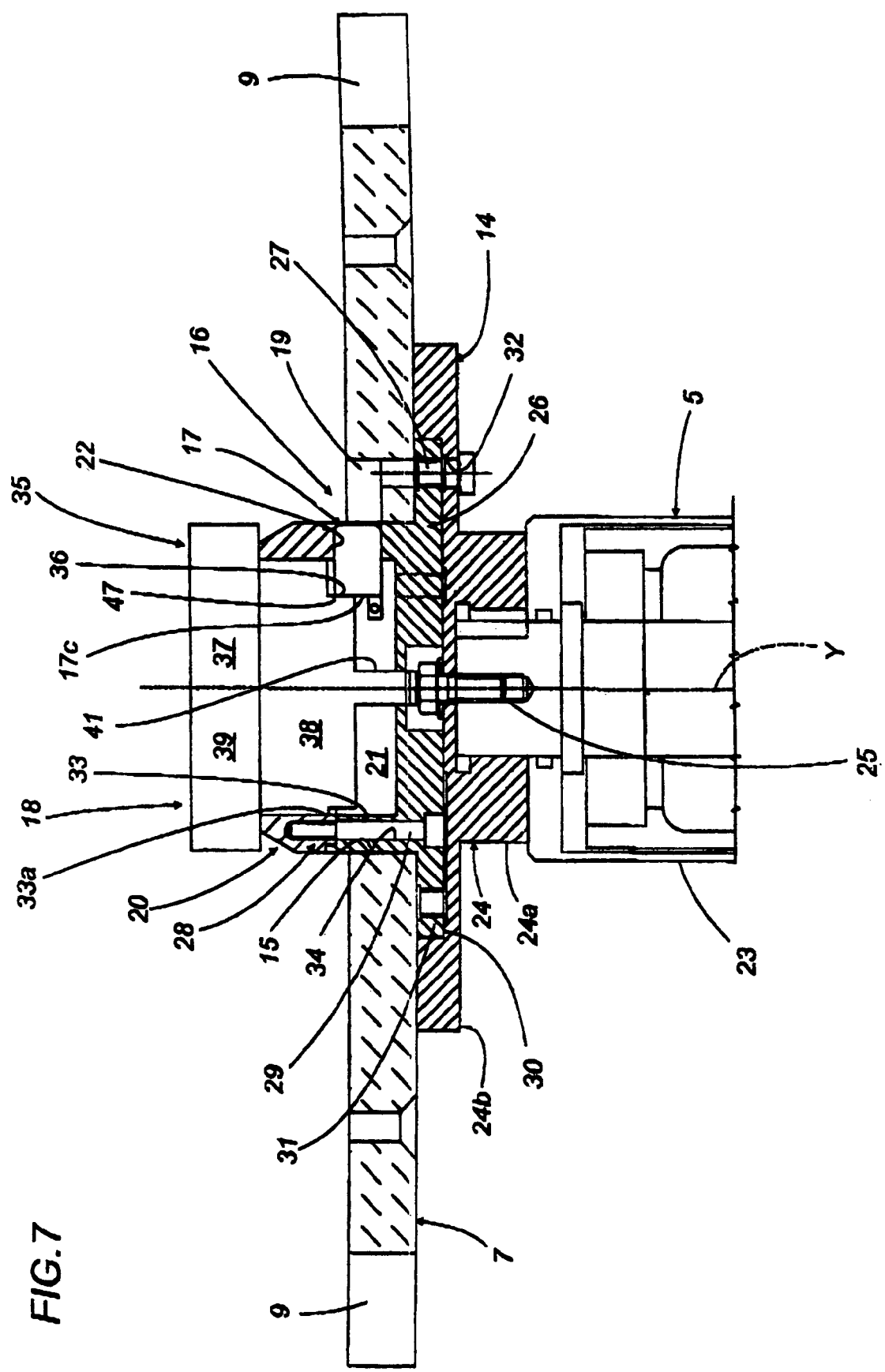
FIG. 7 shows a larger-scale elevation in section of a second embodiment of the FIG. 2 rotary conveyor in a first operating position.

In actual use, when positioning circular plate 7, clamps 17 are housed inside housing 21 in top end 13 of shaft 5, so that, as shown in FIGS. 7 and 8, rear faces 17c of clamps 17 are located inside recesses 49 of lateral wall 47 on the sides of the triangle, in the closest position to longitudinal axis Y.

Figure 9:
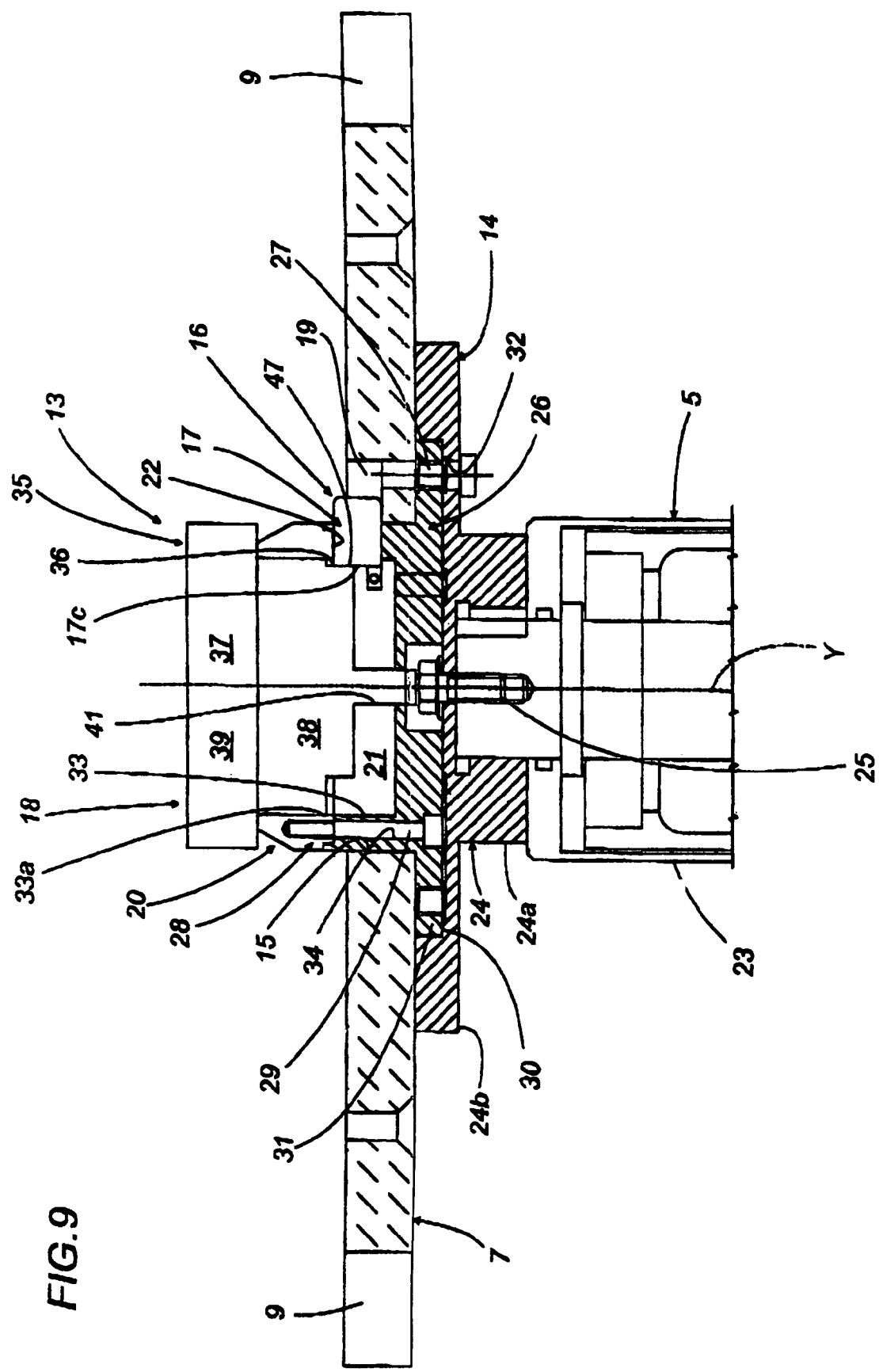
FIG. 9 shows the FIG. 7 conveyor in a second operating position.

When grip portion 37 is rotated manually 60° clockwise or anticlockwise, each lateral face 17c slides on lateral wall 47, and is forced, in opposition to springs 50, away from longitudinal axis Y and into a recess 48 at a vertex of the triangle, as shown in FIGS. 9 and 10; and clamps 17 are pushed along respective radial trajectories B inside cavities 19 in circular plate 7 to clamp plate 7 both axially and rotationally to shaft 5.

Further 60° rotation in the same or opposite direction moves clamps 17, pulled by springs 50, back into the idle position.

In both the embodiments shown, cam surface 36 extends in a plane perpendicular to longitudinal axis Y, along an endless path about longitudinal axis Y, and towards and away from longitudinal axis Y in the form of alternating grooves and ridges equal in number to clamps 17 to be operated.

The present invention solves the problems encountered in the known state of the art, and achieves the objects proposed.

That is, the rotary conveyor according to the present invention permits extremely fast size change of the containers for processing, by enabling fast, easy change of the top plate with no tools required.

Moreover, the highly straightforward, practical design of the fastening means for fastening the plate to the shaft ensures reliability and low production cost.

The invention claimed is:

1. A rotary conveyor comprising
a rotary supporting shaft (5) extending along a longitudinal axis (Y), the supporting shaft (5) having an annular top attachment end (13) having a radial projection (14);
a bottom platform (6) fitted to the supporting shaft (5);
a circular top plate (7) having a central opening (15) by which the circular top plate is fitted to the top attachment end (13) of the supporting shaft (5) so as to rest on the radial projection (14), the circular top plate (7) also having, on its peripheral edge (8), a number of seats (9), each for receiving a container (2) to be conveyed resting on the bottom platform (6); and
fastening means (16) for fastening the circular top plate (7) to the top attachment end (13) of the supporting shaft (5), so as to connect said circular top plate (7) integrally to said supporting shaft (5) and move the seats (9) along a given circular trajectory (A) by rotating the supporting shaft (5);
wherein the fastening means (16) comprise a number of clamps (17) equally spaced angularly about the longitudinal axis (Y) of the supporting shaft (5) and movable between an idle position, in which each clamp (17) is housed inside the top attachment end (13) of the supporting shaft (5) to permit engagement of said top attachment end (13) by the central opening (15) in the circular top plate (7) or removal of the circular top plate from said top attachment end (13), and a work position, in which each clamp (17) projects radially outwards of the top attachment end (13) of the supporting shaft (5) to grip the circular top plate (7) between the radial projection (14) and the clamp (17); and an actuating member (18) for moving each clamp (17) between the work position and the idle position; and
wherein the top attachment end (13) has a lateral wall (20), which is faced and adjacent to the central opening (15) of the circular top plate (7), defines a housing (21) for the clamps (17) and has a number of openings (22) equally spaced angularly about the longitudinal axis (Y) of the supporting shaft (5) to permit passage of said clamps (17).

2. A conveyor as claimed in claim 1, wherein the fastening means (16) comprise three clamps (17) equally spaced angularly about the longitudinal axis (Y) of the supporting shaft (5).

3. A conveyor as claimed in claim 1, wherein the circular top plate (7) also comprises a number of cavities (19) formed close to the central opening (15), and each for insertion of one of the clamps (17).

4. A conveyor as claimed in claim 1, wherein the actuating member (18) comprises a substantially cylindrical body (35) at least partly inserted in rotary manner inside the housing (21) in the top attachment end (13) of the supporting shaft (5), and having a cam surface (36) in contact with the clamps (17) to move said clamps (17) between the work position and the idle position by rotation of the substantially cylindrical body (35).

5. A conveyor as claimed in claim 4, wherein the substantially cylindrical body (35) also has a grip portion (37) located outside the housing (21) and which is gripped manually to operate the actuating member (18).

6. A conveyor as claimed in claim 4, wherein the cam surface (36) is defined in a channel (43) formed in a bottom face (42) of the substantially cylindrical body (35); each clamp (17) having a pin (44) inserted and sliding inside said channel (43).

7. A conveyor as claimed in claim 4, characterized in that the cam surface (36) is defined by a lateral wall (47) of the substantially cylindrical body (35), and extends parallel to the longitudinal axis (Y); each clamp (17) having a respective rear face (17c) contacting said lateral wall (47) of the substantially cylindrical body (35).

8. A conveyor as claimed in claim 4, wherein the cam surface (36) extends in a plane perpendicular to the longitudinal axis (Y), along an endless path about the longitudinal axis (Y), and towards and away from said longitudinal axis (Y) in a form of alternating grooves and ridges equal in number to the clamps (17) to be operated.

9. A conveyor as claimed in claim 4, characterized by also comprising a number of elastic traction members (50) interposed between the clamps (17) to pull said clamps (17) towards one another and towards the longitudinal axis (Y) in opposition to the cam surface (36).

10. A conveyor as claimed in claim 9, characterized in that each of the elastic traction members (50) is a spring connecting two angularly adjacent clamps (17).

* * * * *